Patented Oct. 24, 1939

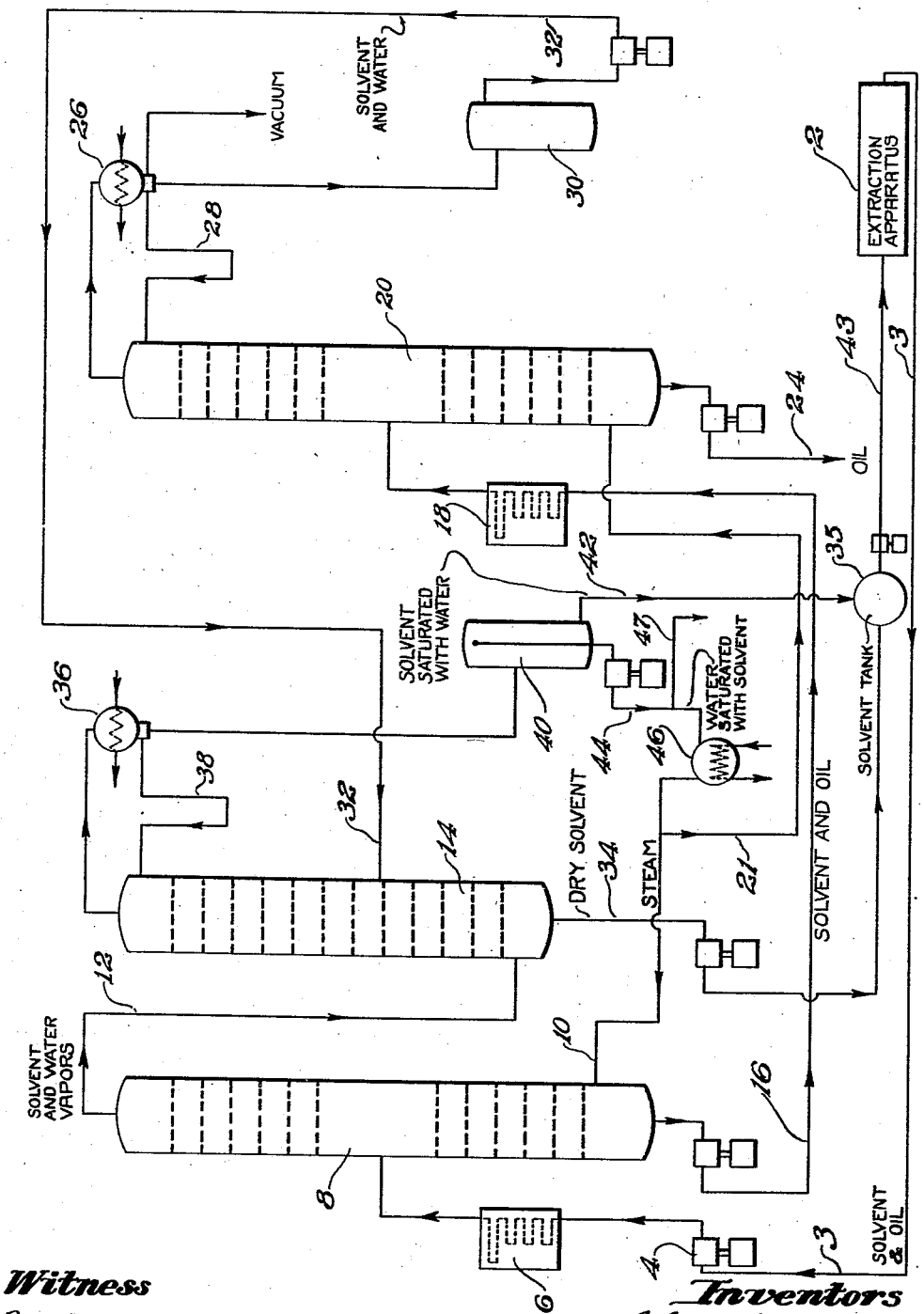

2,177,183

UNITED STATES PATENT OFFICE 2,177,183

SOLVENT RECOVERY METHOD

Wheaton W. Kraft and Merle A. Zimmerman, New York, N. Y., assignors to The Lummus Company, New York, N. Y., a corporation of Delaware Application May 1, 1935, Serial No. 19,245
Renewed July 6, 1939

10 Claims. (Cl. 202—42)

The present invention relates to solvent recovery methods.

In many industrial processes, substantially complete recovery of solvent for re-use in the process is often attended with some difficulty. Frequently the solvent may be recovered from the extracted material by steam stripping but as is sometimes the case, the solvent is of a character to form a constant boiling mixture with water, and the difficulty is then in preventing loss of solvent in the water ultimately removed from the system.

The principal object of the present invention is to provide a method for handling such mixtures without more than a negligible loss of solvent. To this end, the present invention comprises a method suitable for use with certain types of solvents whereby the solvent itself and the water used for steam stripping may be circulated in a closed cycle.

In a system of this type, as will hereinafter appear, water may unavoidably enter the system from an external source and it is a further object of the invention to provide for discharge of said water without entailing any appreciable loss of solvent.

The accompanying drawing is a diagram of the preferred apparatus for practising the present invention.

Although the invention is applicable to processes involving a wide variety of solvents and extracted materials, the principles are best described by reference to a specific example, namely, the separation of a solvent such as cresylic acid or phenol from a mixture thereof with oils obtained in solvent extraction of petroleum.

The extraction apparatus illustrated diagrammatically at 2 gives as one end product a solution of certain oils in cresylic acid. These oils are commonly referred to as extract. There is also obtained from the extraction apparatus a product consisting of paraffinic oils containing an appreciable amount of solvent. These oils are commonly referred to as raffinate. However, since the separation of the solvent from either the extract or the raffinate depends on the same principles, no distinction is herein made, and the system is described as operating on a mixture of cresylic acid solvent with extracted oils, whether such extracted oils be so-called extract or raffinate.

The mixture of cresylic acid and oils is fed from the extraction apparatus by a line 3 through a pump 4 and heater 6 into a column 8 wherein steam is introduced at the bottom through a steam line 10. The column is provided with any suitable means, such as bubble cap decks, for promoting contact between vapors and liquid. A vapor mixture of cresylic acid and water is passed by a vapor line 12 to the bottom of a fractionating column 14 which may be designated as a solvent recovery column.

The residue from the column 8, comprising oil in mixture with some solvent, is pumped by a line 16 through a heater 18 into a second distilling column 20, preferably maintained under vacuum. Steam is introduced through a steam line 21. The oil, practically free from solvent, is withdrawn from the bottom of the column by a line 24. The vapors comprising cresylic acid and steam are condensed in a condenser 26, a part of the condensate being returned to the column 20 as reflux through the pipe 28 and the remainder being collected in a tank 30. The two columns 8 and 20 provide for two-stage separation of the solvent from the oil without the necessity for overheating the materials, although a single column may be used for this purpose if desired.

Cresylic acid and water form an azeotropic mixture. The condensate collected at 30 therefore is subjected to further treatment, and to this end, the mixture is pumped from the tank 30 by a line 32 into a mediate point of the solvent recovery column 14 where it contacts with the solvent and water vapors introduced by the pipe 12. The rectifying action between the vapors introduced at 12, the liquid introduced at 32 and reflux from the top, results in the accumulation of dry solvent at the bottom of the column 14 which is pumped out of the recovery column by a line 34 into a solvent tank 35. The vapors of solvent and water leaving the top of the recovery column 14 constitute an azeotropic mixture of minimum boiling point. This mixture is condensed and cooled in a condenser 36, a portion of the condensate being returned to the column 14 as reflux through the line 38 and the remainder being collected in a tank 40.

The proportions of water and solvent in the constant boiling mixture are not absolutely determined since cresylic acid is a phenol-cresol mixture and not a definite chemical compound, but with cresylic acid within the ordinary range of composition, the constant boiling mixture contains from 5 to 10% of cresylic acid. This mixture has a boiling point lower than that of either cresylic acid or water alone and hence is obtained as the distillate while the dry solvent is obtained as residue in the column 14. Upon condensation of the distillate vapors and cooling to 90 to 110° F., the condensate in the tank 40 separates into two layers, namely, an upper or water layer comprising water saturated with 2 to 3% of cresylic acid and a lower or solvent layer comprising solvent saturated with 15 to 20% of water.

The materials of the two layers are now used directly in other steps of the process. The solvent layer containing 15 to 20% of water is run to the solvent tank 35 by a pipe 42 to be mixed with the dry solvent obtained at 34 and the whole mixture is re-used in the solvent extraction process. A line 43 connects the solvent tank with the extraction apparatus 2. It will be understood that the greater part of the solvent is recovered as dry solvent at 34 so that the percentage of water in the entire mixture is relatively small.

The upper or water layer in the vessel 40 containing 2 to 3% of cresylic acid is used for stripping steam in the distilling columns 8 and 20. To this end, the water layer is pumped from the vessel 40 through a pipe 44 and heated by a heat exchanger or indirect heater 46 to generate steam. The pipes 10 and 21 leading to the bottom of the columns 8 and 20, respectively, are fed with steam from the heater 46. A draw-off pipe 47 is connected to the pipe 44 for voiding water from the system, as will hereinafter be described.

In the specific example above given, the percentage of cresylic acid in the steam introduced into the distilling columns 8 and 20 is not large enough to have any material influence on the distillation. If the water layer contains 2.4% of cresylic acid, the molal percentage of cresylic acid will be only about 0.4, since the molecular weights of the two materials are in the ratio of about 6 to 1. The partial pressure of the cresylic acid on steam at 760 mm. absolute pressure is therefore only about 3 mm. of mercury. Under these conditions, the solvent may be almost completely stripped from the oil with steam generated from the water layer.

It will be seen that the materials obtained in the vessel 40 are continuously circulated in a a closed cycle and that therefore if no water enters the system from any external source, the process could be carried on indefinitely as above described with only such make-up of solvent as is necessary to compensate for unavoidable losses occurring in any distilling method. However, some water unavoidably enters the system, either with the charged crude oil or in some other manner. Although such water as may be introduced in this way is small in quantity, it cannot be permitted to remain indefinitely since it would ultimately build up to a considerable amount. The purpose of the draw-off pipe 47 is to void the system of such water which may be done either continuously or intermittently. The water removed at 47 contains 2 to 3% of solvent and this represents a loss of solvent, but since the water is extremely small in amount, the solvent loss is negligible.

Although the invention has been described as applied to a process for solvent extraction of petroleum oils, the invention is not limited to such process. The apparatus 2 may be any contact apparatus resulting in mixture of a solvent and an extracted material.

For application of the principles of solvent recovery according to the present invention, the solvent must be one which forms a constant boiling mixture with water and which is miscible, at least partially, with water. If the solvent does not form a constant boiling mixture with water, the recovery can be effected by simple distillation. Many of the solvents used in industrial processes, however, are not amenable to recovery by simple methods, and the present invention may then be applicable.

It will be seen that the invention is of the greatest value when the ultimate condensate comprises either the solvent saturated with a small quantity of water or water saturated with a small quantity of solvent; in the former case, the mixture may be used in conjunction with unsaturated solvent for further extraction, and in the latter case, the mixture may be used as process steam. In the specific example above given, both of these conditions arise, since the condensate divides into two layers of widely different proportions which are available for separate re-use.

Having thus described the invention, what is claimed is:

1. In a method of recovering a solvent from a solution of an organic material therein, the solvent being of a character to form with water an azeotropic mixture condensable in a water layer containing a small proportion of solvent and a solvent layer containing a small proportion of water, the steps which consist in circulating the material of the water layer in a closed cycle by vaporizing said material and utilizing it as a stripping medium to strip solvent from the original solution, fractionating the stripped vapors of solvent and water substantially between dry solvent as residue and said azeotropic mixture as distillate, and condensing and cooling the distillate vapors to form the above mentioned solvent layer and water layer and thereby to complete the closed cycle of the water layer.

2. In a method of recovering a solvent from a solution of an organic material therein, said solution containing a small quantity of water, the solvent being of a character to form with water an azeotropic mixture condensable in a water layer containing a small proportion of solvent and a solvent layer containing a small proportion of water, the steps which consist in circulating the material of the water layer in a closed cycle by vaporizing said material and utilizing it as a stripping medium to strip solvent from the original solution, fractionating the stripped vapors of solvent and water substantially between dry solvent as residue and said azeotropic mixture as distillate, condensing and cooling the distillate vapors to form the above mentioned solvent layer and water layer and thereby to complete the closed cycle of the water layer, and voiding from said closed cycle a small portion of the material of the water layer to compensate for the water contained in the original mixture.

3. In a method of recovering a solvent from a mixture thereof with extracted petroleum oils, the solvent being of a character to form with water an azeotropic mixture condensable in a water layer containing a small proportion of solvent and a solvent layer containing a small proportion of water, the steps which consist in circulating the material of the water layer in a closed cycle by vaporizing said material and utilizing it as a stripping medium to strip solvent from the oils, fractionating the stripped vapors of solvent and water substantially between dry solvent as residue and said azeotropic mixture as distillate, and condensing and cooling the distillate vapors to form the above mentioned solvent layer and water layer and thereby to complete the closed cycle of the water layer.

4. In a method of recovering a solvent from a mixture thereof with extracted petroleum oils, the solvent being of a character to form with water an azeotropic mixture condensable in a water layer containing a small proportion of solvent and a solvent layer containing a small proportion of water, the steps which consist in circulating the material of the water layer in a closed cycle by vaporizing said material and utilizing it as a stripping medium to strip solvent from the oils, fractionating the stripped vapors of solvent and water substantially between dry solvent as residue and said azeotropic mixture as distillate, condensing and cooling the distillate vapors to form the above mentioned solvent layer and water layer and thereby to complete the closed cycle of the water layer, and voiding from said closed cycle a small portion of the material of the water layer to compensate for the water contained in the original mixture.

5. In a method of solvent extraction and recovery with a solvent which is of a character to form with water an azeotropic mixture condensable in a water layer containing a small proportion of solvent and a solvent layer containing a small proportion of water, the steps which consist in circulating the material of the solvent layer in a closed cycle through an extraction zone for contact with petroleum oils, a stripping zone for separation of the solvent from the oils, a fractionating zone and condensing zone, circulating the material of the water layer in a second closed cycle by vaporizing it and passing it as a stripping medium to the stripping zone and thence to the fractionating and condensing zones, the stripped vapors of solvent and water being fractionated substantially between dry solvent as residue and said azeotropic mixture as distillate, and the distillate vapors being condensed and cooled in the condensing zone to form the above mentioned solvent layer and water layer.

6. In a method of recovering cresylic acid solvent from a mixture thereof with extracted petroleum oils, the solvent being of a character to form with water an azeotropic mixture condensable in a water layer containing a small quantity of cresylic acid and a solvent layer containing a small quantity of water, the steps which consist in circulating the material of the water layer in a closed cycle by vaporizing said material and utilizing it as a stripping medium to strip solvent from the original mixture, fractionating the stripped vapors of solvent and water substantially between dry solvent as residue and said azeotropic mixture as distillate, and condensing and cooling the distillate vapors to form the above mentioned solvent layer and water layer and thereby to complete the closed cycle of the water layer.

7. In a method of solvent extraction and recovery with a solvent which is of a character to form with water an azeotropic mixture condensable in a water layer containing a small proportion of solvent and a solvent layer containing a small proportion of water, the steps which consist in circulating the material of the water layer in a closed cycle by vaporizing said material and utilizing it as a stripping medium to strip solvent from the original mixture, fractionating the stripped vapors of solvent and water substantially between dry solvent as residue and said azeotropic mixture as distillate, condensing and cooling the distillate vapors to form the above mentioned solvent layer and water layer and thereby to complete the closed cycle of the water layer, and voiding from said closed cycle a small portion of the material of the water layer to compensate for the water contained in the original mixture.

8. In a method of solvent extraction of a solution of an organic material therein, the solvent material being of a character to form with water an azeotropic mixture condensable in a water layer containing a preponderant amount of water, the steps which consist in circulating the material of the water layer in a closed cycle by vaporizing said material and utilizing it as a stripping medium to strip solvent from the original solution, fractionating the stripped vapors of solvent and water substantially between dry solvent as residue and distillate vapors as overhead, approaching said azeotrope in composition, and condensing and cooling the distillate vapors to form the water layer, and thereby to complete the closed cycle of the water layer.

9. In a method of recovering a solvent from a solution of an organic material, as claimed in claim 8, the step of removing a substantial portion of the solvent from the overhead distillate prior to the vaporizing of the distillate vapor condensate for stripping steam.

10. In a method of recovering a solvent from a solution of an organic material, as claimed in claim 8, in which the azeotropic mixture of solvent and water are condensable in two layers, the second of which is preponderantly solvent, and said two layers are decanted to remove the water layer prior to vaporization and continuous circulation in a closed cycle.

WHEATON W. KRAFT.
MERLE A. ZIMMERMAN.